United States Patent [19]

Hayden et al.

[11] Patent Number: 4,784,033
[45] Date of Patent: Nov. 15, 1988

[54] TRIPLE CHIP GROUND CARBIDE TIP BANDSAW BLADE WITH DUCTILE FILLER

[75] Inventors: Robert C. Hayden, Branford; Michael P. Wanat, Wallingford, both of Conn.

[73] Assignee: Milford Products Corporation, Branford, Conn.

[21] Appl. No.: 923,424

[22] Filed: Oct. 27, 1986

Related U.S. Application Data

[63] Continuation-in-part of Ser. No. 821,275, Jan. 22, 1986, abandoned.

[51] Int. Cl.⁴ .................. B23D 61/12; B23D 61/14
[52] U.S. Cl. .......................... 83/661; 83/835; 76/101 A; 76/112; 407/119
[58] Field of Search .............. 83/835, 661; 76/101 A, 76/112; 407/119

[56] References Cited

U.S. PATENT DOCUMENTS

| Re. 31,433 | 11/1983 | Clark . |
| 303,787 | 8/1884 | Arnold . |
| 2,462,002 | 2/1949 | Read ........................... 407/119 X |
| 2,635,482 | 4/1950 | Von der Werth . |
| 3,169,435 | 2/1962 | Hartger . |
| 3,487,514 | 1/1970 | O'Brien ........................ 407/119 X |
| 3,528,465 | 9/1970 | Omley ........................... 407/119 X |
| 3,576,061 | 4/1971 | Pahlitasch . |
| 3,576,200 | 4/1971 | Elmes . |
| 3,610,880 | 11/1971 | Pahlitzsch . |
| 3,818,561 | 6/1974 | Montana et al. . |
| 3,878,747 | 4/1975 | Soderstrom . |
| 4,011,783 | 3/1977 | Mobley . |
| 4,012,820 | 3/1977 | Nowak . |
| 4,023,448 | 5/1977 | Bertini . |
| 4,114,494 | 9/1978 | Budke et al. . |
| 4,173,914 | 11/1979 | Vollmer et al. . |
| 4,214,499 | 7/1980 | Ellis . |
| 4,232,578 | 11/1980 | Stellinger et al. . |
| 4,257,302 | 3/1981 | Heimbrand . |
| 4,292,871 | 10/1981 | Neumeyer et al. . |

FOREIGN PATENT DOCUMENTS 54885  6/1982  European Pat. Off. .

*Primary Examiner*—Donald R. Schran
*Attorney, Agent, or Firm*—Emrich & Dithmar

[57] ABSTRACT

A bandsaw blade including a continuous loop of hardened tempered bandsaw steel having carbide-tipped teeth arranged in pairs, each pair including a "high" tooth and a "low" tooth shaped to provide triple-chip cutting action and ground to provide radial and tangential relief angles on side surfaces of each saw tooth to reduce blade vibration during cutting. The teeth are secured to the blade body by brazing with a solder which includes a discrete layer of a ductile metal which absorbs forces induced in the brazing zone under dynamic load conditions.

24 Claims, 3 Drawing Sheets

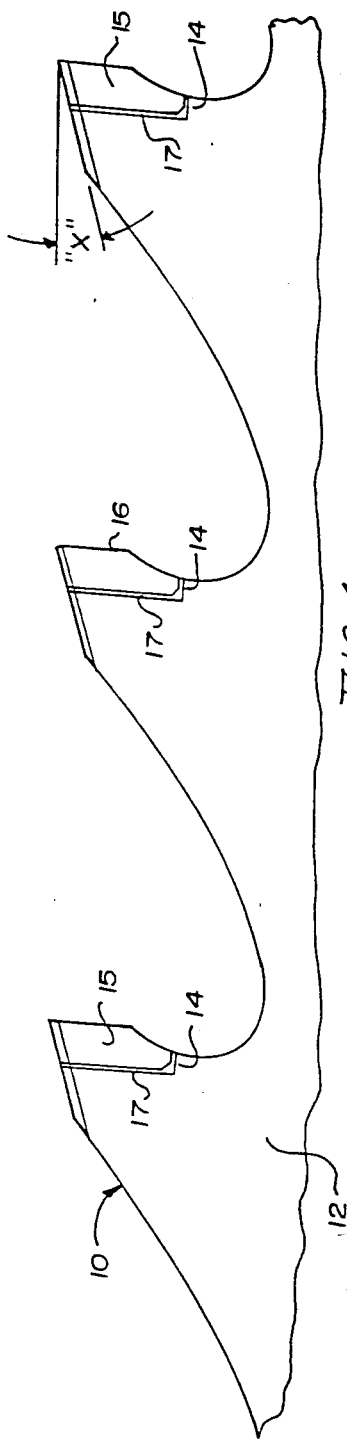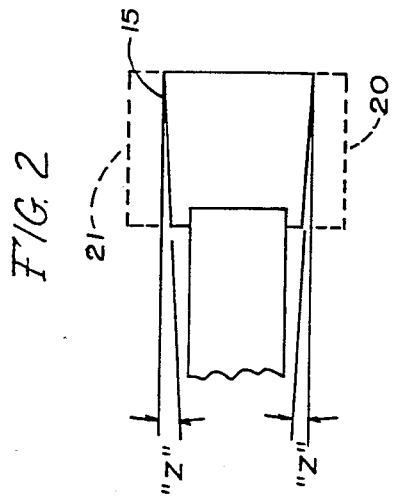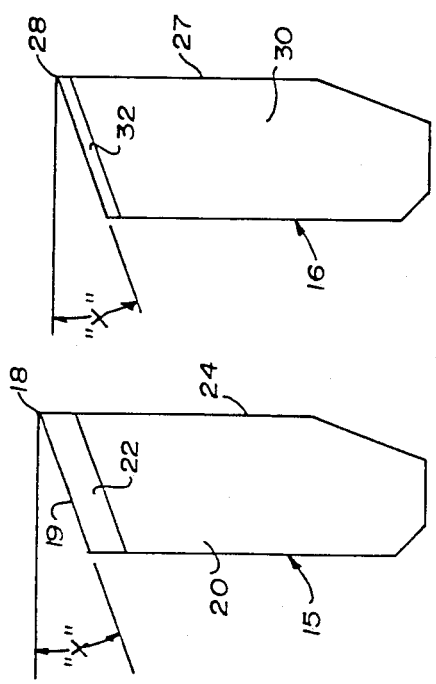

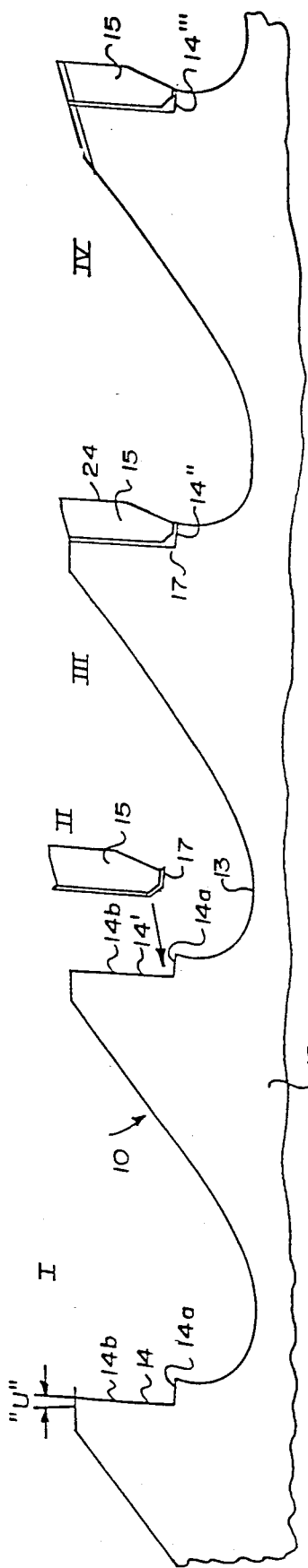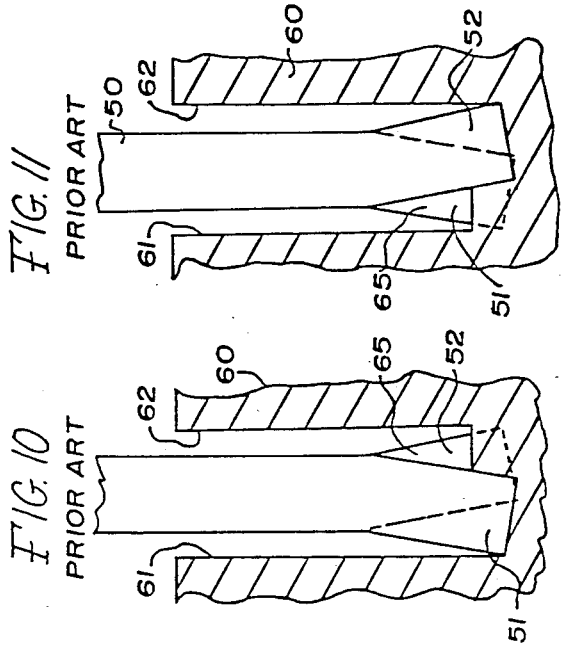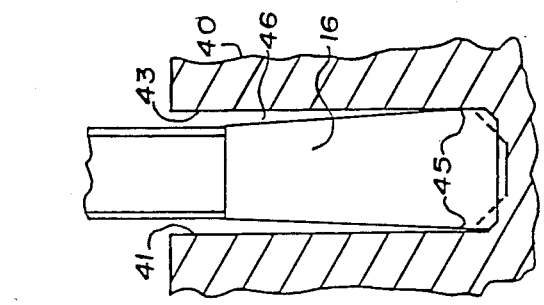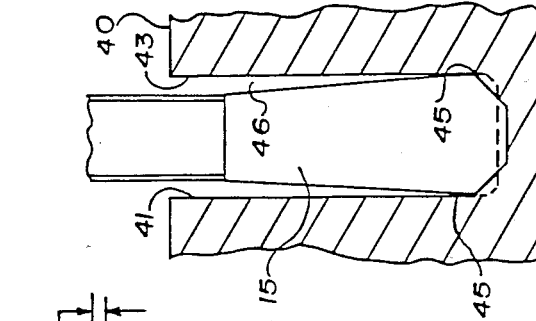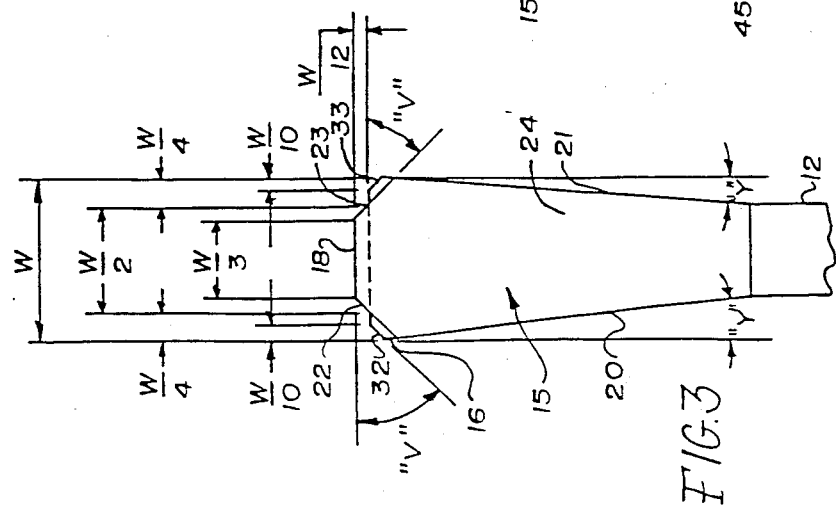

TRIPLE CHIP GROUND CARBIDE TIP BANDSAW BLADE WITH DUCTILE FILLER

RELATED APPLICATION

This is a continuation-in-part of pending U.S. application Ser. No. 821,275, filed Jan. 22, 1986, and entitled "METAL-CUTTING TRIPLE CHIP GROUND CARBIDE TIP BAND SAW BLADE" now abandoned.

BACKGROUND OF THE INVENTION

The invention relates to saw blades of the type used for cutting metal work pieces, such as band saw blades and hack saw blades.

Conventional band saw blades are formed with teeth of uniform size and pitch throughout with alternate teeth being bent outward relative to the plane of the blade. Conventionally set band saw blades are characterized by uneven side-to-side tooth set which causes crooked cutting and non-symmetrical cutting forces on the teeth, which cause vibration, noise and wear. Also, when conventional band saw blades are used to cut large sections of metal, the blades may be subjected to bending or setting of the teeth. Thus, band saw blades with teeth of uniform size and pitch throughout are subject to increased wear, thereby shortening the lifetime of the blades.

An improved band saw blade is disclosed in U.S. Pat. No. Re. 31,433. The band saw blade has an arrangement and form of teeth designed to reduce vibration, cutting noise and chatter and to enhance cutting speed and blade life. Cutting teeth are alternately arranged in recurrent groups in which each group comprises a series of different teeth. The teeth in each group differ from each other in size, pitch, and angle of bend, and also in rake angle. The outer tips of all of the teeth are in substantial alignment, the difference in size of the teeth being attained in the variations in the depth of the gullets.

A further attempt to realize a band saw blade characterized by improved cutting rate and extended life is disclosed in U.S. Pat. No. 4,292,871. The band saw comprises a plurality of saw teeth of hard metal which are welded to a base portion of a strong flexible material. Rake angles and relief angles are selected to define a saw tooth geometry having a positive rake angle with increased tooth mass while maintaining a large gullet space to provide good chip removal along with strong tooth tip configuration and a large heat transfer tooth mass to enhance cutting rate and blade lifetime. However, the high temperatures, in the order of 2600° F. required for fusion welding result in thermal stresses in the weld zone which ultimately contribute to failure of the weld because of the constant bending of the band saw blade around a lateral axis during its rotation, and the carbide tips may break off reducing the lifetime of the saw blade. Also, a hard metal piece broken off in this way will often become embedded in the cut causing damage to following teeth of the saw blade as well.

One attempt at solving this problem is disclosed in the European patent Application, published June 30, 1982. This application discloses a band saw blade fitted with hard metal plates which are soldered onto the blade body. With this arrangement, the thermic stresses are largely contained in the intermediate soldering layer. However, because band saw blades have a relatively small body thickness, typically in the order of 0.062 inches, any chips carried by the blade back into the cut could tend to deflect the band saw tooth laterally into the side of the material being cut. Such lateral deflection of the tooth results in a twisting torque on the carbide tip causing both compressive and tensive stresses on the joint which could ultimately result in failure of the joint if the tensile strength of the soldered joint is exceeded.

It is the nature of triple-chip bandsaw cutting to remove a chip which more closely resembles a milling chip, which is longer and thicker than is generated by a conventionally set blade. It is the combination of the heavy chip and the zero clearance between the carbide tooth and the kerf which forces the tooth to displace laterally. The dynamic forces on the tooth during entry into the cut, which are transitory in nature, are capable of dislodging the tooth from the blade. Once the tooth has successfully entered the cut, it is no longer vulnerable to damage other than normal wear. This condition was not recognized or anticipated as being the fundamental weakness of the blade. Although bandsaw machines are normally fitted with brushes to remove the chips, they are in general practice not adequately maintained or properly used and chip carry over is very common.

While these improved band saw blades address to some extent blade vibration and useful lifetimes, it is desireable to have a band saw blade which achieves high cutting rates, straight cuts, and extreme smoothness of the cut surface while maintaining long blade life and which is capable of cutting large sections of metal with accuracy unattainable using conventional blades with set teeth.

SUMMARY OF THE INVENTION

It is an object of the present invention to provide an improved band saw cutting blade which minimizes the effects of compressive and tensile stresses on the band saw under dynamic load conditions.

It is an object of the present invention to provide an improved band saw cutting blade which achieves high cutting rates, straight cuts, and extreme smoothness of the cut surface while maintaining long blade life.

Another object of the invention is to provide an improved band saw blade and which is capable of cutting large sections of metal with accuracy unattainable using conventional blades with set teeth.

Another object of the invention is to provide an improved band saw blade characterized by reduced blade vibration during cutting.

These and other objects are achieved by the present invention which provides a band saw blade for high speed heavy cutting, including a blade body of a continuous loop of hardened and tempered metal having a plurality of cutting tooth support means defined along the peripheral edge thereof and separated by gullet means, a plurality of cutting teeth mounted on said blade body in the tooth support means thereof and arranged in pairs, each of pair of cutting teeth including a leading high tooth and a trailing low tooth constructed and arranged to effect a triple-chip cutting operation on a workpiece, and solder means securing said cutting teeth to said support means, said solder means defining a filler including a layer of a ductile metal for absorbing stress forces induced in the band saw blade under dynamic load conditions.

In accordance with the invention, the filler is interposed between the cutting teeth and the blade body tooth support means over substantially the entire mutually contacting area portions thereof for each tooth and its associated tooth support means. The filler provides cushion and energy absorption characteristics which absorbs both tensile forces created by torque loads applied to the low teeth of the triple chip pair and the compressive shock loads applied to the high tooth of the triple chip pair. During impact of the teeth with the material being cut, the stress is built up only to the yield strength of the filler beyond which there is only a ductile energy absorbing distortion of the filler and the stresses are not absorbed by the teeth: It has been found that the use of a solder means including a filler with a discrete layer of ductile metal for absorbing stress forces, in accordance with the present invention, minimizes the loads which can cause fracture of the teeth and/or breaking off of the teeth which could result in rippage and failure of the following teeth as they engage metal lodged in the cut.

Further in accordance with the invention, the provision of a band saw blade having saw teeth arranged in pairs to effect triple chip cutting operation, results in a band saw blade capable of achieving high cutting rates, straight cuts with extreme smoothness of the cut surface. In addition, the band saw blade is characterized by extended blade lifetime and may be sharpened up to 10 times, further extending the useful life of the blade. Relief angles on the side surfaces of the saw teeth define side clearance between the cutting edge of the teeth and the kerf of the cut which reduces the opportunity for blade vibration during cutting. The provision of triple-chip ground blade enables the blade to be used for cutting large sections of metal up to 60 inches square with accuracy unachievable using conventional blades with set teeth because tooth tip provides clearance for the blade to move through the cut without bending or setting the teeth as would be experienced in conventional band saw blades.

The invention consists of certain novel features and structural details hereinafter fully described, illustrated in the accompanying drawings, and particularly pointed in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is a fragmentary side view of a band saw blade with triple chip ground teeth provided in accordance with the present invention;

FIG. 2 is a bottom view of one of the teeth of the band saw blade shown in FIG. 1, illustrating the tangential relief angle;

FIG. 3 is a showing of one of the high teeth (in full lines superimposed on one of the low teeth in dotted lines) together with certain dimensional relationships;

FIG. 4 illustrates the band saw blade during manufacture, illustrating the formation of the teeth pockets and the attachment of the cutting teeth to the blade base;

FIGS. 5 and 5A are side elevation views of a high tooth and a low tooth, respectively;

FIGS. 8 and 9 illustrate respectively a high tooth and a low tooth in a cut, showing the kerf, showing the lateral clearance between the sides of each tooth and the sides of the kerf during a cutting operation; and FIGS. 10 and 11, which are labeled prior art, illustrate alternating set teeth, in a kerf, illustrating the clearance provided between the lateral edges of the teeth and the sides of the kerf during a cutting operation.

DESCRIPTION OF THE PREFERRED EMBODIMENTS

Figure 6:
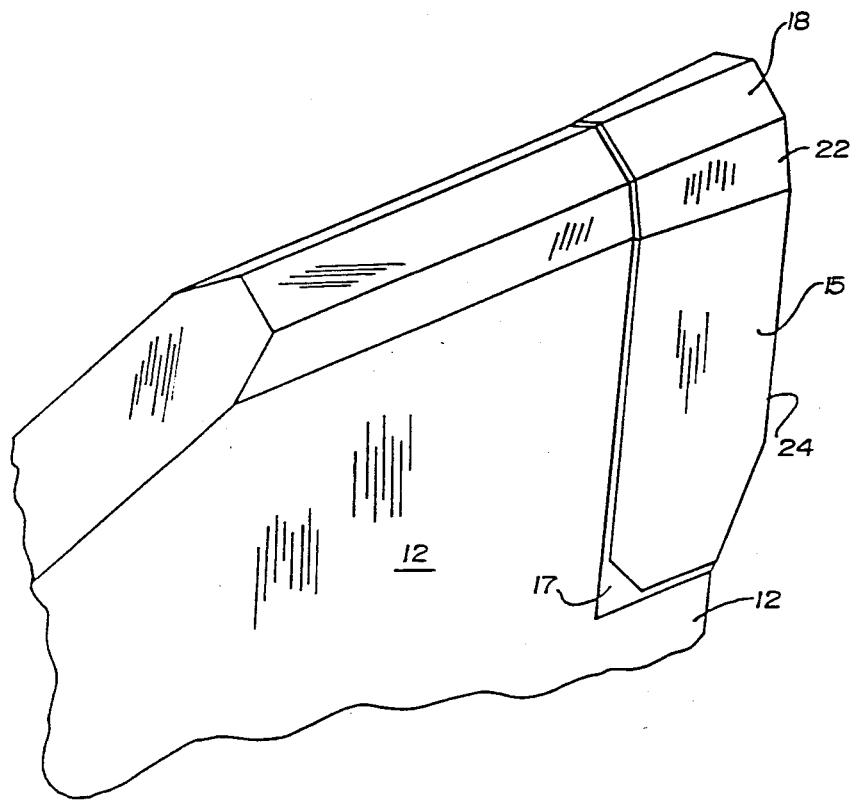
FIG. 6 is an enlarged fragmentary perspective view illustrating a tooth insert brazed to the blade support.

Referring to FIG. 1, there is illustrated a portion of a band saw blade 10 provided in accordance with the present invention. The band saw blade 10 includes a blade body or base portion 12 which defines a series of teeth-supporting pockets 14 in which are located high cutting teeth 15 alternately spaced between low cutting teeth 16, each pair of high and low teeth 15 and 16 being formed and positioned to effect a triple-chip cutting operation on a workpiece. Cutting teeth 15 and 16 are of specially hard material such as tungsten carbide or similar hard materials and they are brazed into the teeth-supporting pockets 14. As will be shown, the brazed joint provided by brazing solder or filler 17 includes an interlayer of a ductile metal which provides energy absorption characteristics which prevent failure of the brazed joint due to stresses under dynamic load conditions.

Figure 7:
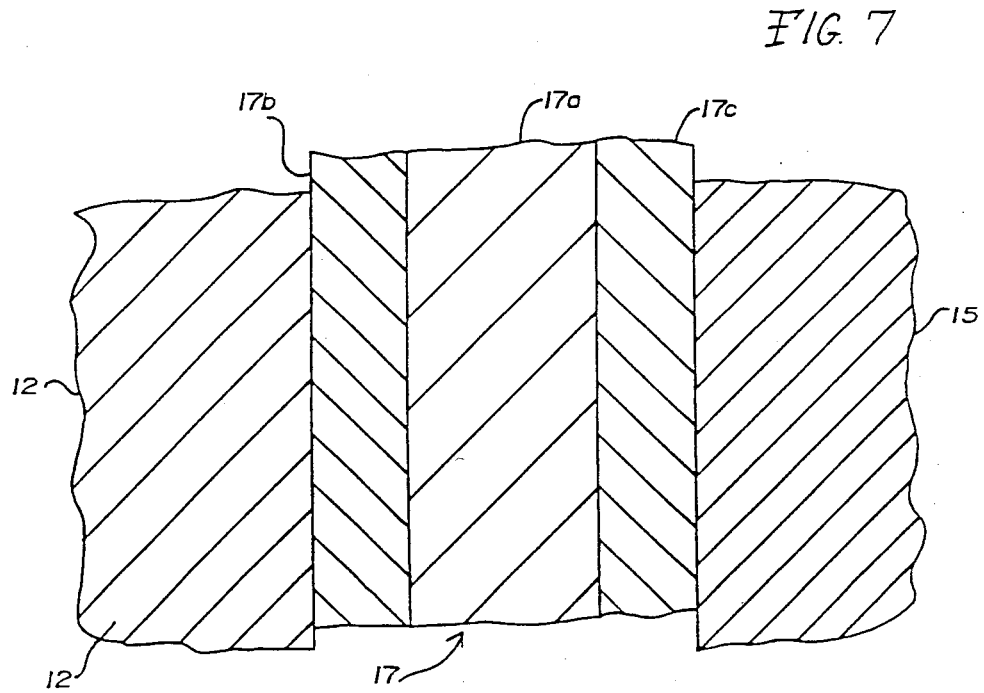
FIG. 7 is an enlarged fragmentary view of the brazed junction showing the filler sandwiched between a tooth insert and blade backing.

Referring to FIGS. 1, 6 and 7, the filler 17 comprises a discrete layered solder, which in one band saw which was constructed and tested, included silver solder and copper. As shown in FIG. 7, the filler 17 includes an inner layer 17a of ductile copper sandwiched between layers 17b and 17c of silver solder. In a band saw which was constructed, the copper inner layer 17a was 0.005 inches and each of the silver solder layers 17b, 17c was 0.001 inches thick, the overall thickness of the filler 17 being 0.007 inches after brazing and the width of the filler being 0.100 inches. The silver solder layers 17b, 17c contained approximately 50% silver mixed with approximately 15% copper, 15% zinc and 15% cadium, and the inner layer 17a contained 100% ductile copper.

The filler 17 covers the surfaces 14a and 14b (FIG. 4) substantially over their entire extent to maximize the area of the joint between the tooth 15 (or 16) and the teeth supporting pocket 14 in which it is attached to the blade body 12. For a triple chip blade, the brazed area does not exceed 0.018 square inches and its maximum linear dimension is 0.25 inches. The copper containing filler 17 provides the necessary cushion and energy absorbing characteristics necessary to prevent the failure of the brazed joint under dynamic loads.

The filler 17 minimizes forces or stresses induced in the brazed joint as the band saw blade bends around the machine wheels and in twisted through the guides. The low tooth 16 removes two equal chips with its outside cutting corners which makes it prone to the torque loads caused by lateral deflection. The high tooth 15 removes a single chip from the center of the cut. Although the high tooth 15 is not prone to the torque loads of the low teeth 16, it is prone to compressive shock loads when cutting material with a hard scale. In both cases, the filler 17 acts as a shock absorber and minimizes the loads which can cause fracture of the carbide tooth insert 15 or 16.

The copper has a yield strength of approximately 20,000 PSI which is well below the stress levels required to fracture the carbide tooth insert 15 or 16. In accordance with the invention, the copper containing filler 17 within the brazing zone provides a relatively thick shock absorbing cushion for the carbide tooth inserts. During impact of the carbide tooth insert 16 (the low tooth) with the side of the cut, the stresses build up only to the yield strength (20,000 PSI) of the filler 17 beyond which there is only a ductile energy absorbing distortion of the filler, which absorbs the very high compression and tension forces. These high stress levels last for only a milli-second or less, and the total energy absorbed is small and any distortion of the filler 17 or tooth position is not significant.

The teeth 15 and 16, in pairs, are spaced one from another around the length of a continuous loop of the band body saw and are shaped, as leading high teeth 15 and trailing low teeth 16 to provide a triple-chip cutting action. The top, face and side planes of the tungsten carbide teeth are precision ground to specific angles for cutting various types of metal. The blade can be manufactured with various tooth spacings depending on the material to be cut. By way of example, the band saw blade pitch may provide three teeth per inch, two teeth per inch, one tooth per inch, one tooth per 1.25 inch spacing, one tooth at 1.5 inch spacing or one tooth at two inch spacing, as is desired to achieve optimum cutting efficiencies.

Referring to FIGS. 1, 3 and 5, each leading high tooth 15 is of generally key-stone shape in its frontal aspect, and includes a leading front face 24 defining at its upper end an outer cutting edge 18, which merges with top surface 19. The maximum lateral extent of the front surface 24 is designated W in FIG. 3. The lateral extent of top surface 19 and cutting edge 18 is W/3. Side surfaces 20 and 21 merge with corner surfaces 22 and 23 respectively which extend downwardly at an angle V from the top surface 19 to the respective side surfaces 20 and 21. The corner angle V is preferably in the range of between about 30 degrees to 52 degrees, and in one embodiment the preferred angle was 45 degrees.

Referring to FIGS. 1 and 5, the top surface 19 slants downward rearwardly at a clearance angle X in the range of between about 5 degrees to 19 degrees relative to the longitudinal axis of the band saw blade. The preferred clearance angle in one embodiment was 15 degrees.

Due to the slanting surface 14b of the pocket in which the tooth 15 is mounted, the front face 24 is positively raked in that it extends at angle U in the range of between about 0 degrees to 10 degrees relative to a line running perpendicular to the longitudinal axis of the band saw. In one embodiment, the face angle was preferably 5 degrees. It is apparent that the generally vertical pocket surface 14b (FIG. 4) may be formed to be normal to the axis of the blade body and the front face 24 of the high tooth 15 (and front surface 27 of low tooth 16) may be ground to provide the desired face angle.

Referring to FIG. 3, the sides 20 and 21 of tooth 15 are ground to a radial relief angle Y in the range of between about 2 degrees to 4 degees, and, preferably, 3 degrees relative to a line extending perpendicular to the longitudinal axis of the band saw blade. Referring to FIG. 2, the ground side surfaces 20 and 21 provide a tangential relief angle Z in the range of between about 2 degrees to 7 degrees, and, preferably, 4 degrees. The precision grinding of the teeth provides proper relief angle on the side surfaces of the saw tooth, reducing the opportunity for blade vibration during cutting.

Referring to FIGS. 1, 3 and 5A, each low tooth 16 is also of generally key-stone shape in its frontal aspect, and is generally the same shape as the high tooth 15, but shorter in height locating its top cutting edge 28 lower than the top cutting edge 18 of the high tooth 15. Low tooth 16 has front face 27, top surface 29, side surfaces 30 and 31, and corner surfaces 32 and 33. As illustrated in FIG. 3, the cutting edge 18 of the high tooth 15 extends a distance W/12 higher than the cutting edge 28 of the low tooth 16. Also, the lateral width of the low tooth 16 is at corner surfaces 32 and 33 greater than the maximum lateral width W at corners 22a and 232a of the high tooth 15 to define two lateral cutting edges 32a, 33a which extend between top surface 29 of low tooth 16 and its side surfaces 30 and 31.

Referring to FIG. 3, for a given width W of the tooth 15 at its maximum lateral extent, the lateral width of the top surface 19 is typically one-third of the lateral width W of the tooth 15. The lateral extent of the cutting surfaces of the low tooth 16 is approximately 1/10 W, where W is the lateral width of the tooth 16. When viewed from fore-to-aft in FIG. 3, the points of intersection of the cutting edge 28 of the low tooth with the side cutting surfaces 22, 23 and the high tooth 15 occurs at approximately ¼ the lateral width of the tooth 15.

In one embodiment having a tooth spacing of one inch, the maximum lateral width W of the teeth was 0.100 inches (2.54 mm) the width of the top surface 19 was 0.050 inches (1.27 mm) and the height of the cutting edge 18 above cutting edge 29 was 0.008 inches (0.2 mm). Face angle U was 5 degrees. Clearance angle X was 15 degrees. Radial relief angle Y was 3 degrees, and tangential relief angle Z was 4 degrees. The corner angle V was 45 degrees.

Referring to FIG. 4, the manner in which triple-chip ground band saw blade 10 is manufactured will now be described. The blade body 12 is formed on a punch press from a prehardened and tempered strip of steel. The blank is prepared in rough tooth form. Then, the pockets 14 are formed in the blade body 12 in a grinding operation. As shown in position I in FIG. 4, the pockets are defined by shoulder 14a which terminates in a vertically extending surface 14b of the blade body 12 rearward of associated gullet 13. Surface 14b is inclined off normal at an angle U which sets the face or rake angle for the cutting teeth. Then, at the brazing position II, the filler 17 is applied to the carbide tooth insert 15. The filler is fed in roll form, the material being approximately 0.012 inches (0.3 mm) thick and 2.5 mm wide. The filler material is cut and bent in a generally L-shape and placed upon the carbide insert 15 with the filler 17 extending along the rearward and bottom edges of the insert 15. The insert tooth 15 and filler 17 thus assembled are then positioned on the pocket 14' and heated as by induction heating at 770° F. for approximately 2–3 seconds.

Then, at position III, with the carbide tooth insert 15 brazed in position on the saw body 12, the tooth is ground to the desired triple-chip geometry in a plural step grinding operation. First the forward face 24 (FIG. 3) is ground to provide the desired face angle U. Then in a double-side grinding operation, the radial relief angle Y and the tangential relief angle Z and corner angles V are provided. Then the top of the teeth inserts 15 and 16 are ground to provide the desired 0.008 inch difference in height between the front or high teeth 15 and the rear or low teeth 16, and to define the clearance angles X. Finally, the teeth are ground with a chamfer at the lower portion of their forward edges.

Referring to FIGS. 8 and 9, it can be seen that with the triple-chip ground geometry, there is an absence of clearance between the teeth 15, or 16, and the side walls 41, 43 of the kerf of the workpiece 40 as at 45 while lateral relief angles inward of the cutting surfaces provide limited clearnace for the body of the teeth as at 46. In contrast, as shown in FIGS. 10 and 11, conventionally set blades 50, having teeth 51, 52, bent outward from the plane of the blade, provide undesireably clearance between the cutting surfaces and the walls 61, 62 of the kerf 60 in the proximity of the cutting surfaces as at 65, resulting in vibration of the cutting blade during cutting and thereby resulting in fatique and wear which reduces useful lifetime.

As indicated, the top, face and side planes of the teeth 15 and 16 are precision ground to a specific angle for cutting various types of metal, and the ranges for the top ngle, face angle, and side angles, including tangential relief, radial relief and corner angles, has been given hereinabove.

By triple chip grinding the carbide teeth 15 and 16, it is possible to achieve high cutting rates, straight cuts, long blade life and extreme smoothness of the cut surface. Similar results are unattainable with convention metal-cutting band saw blades. In addition, the triple chip ground carbide tip blade may be sharpened up to 10 times, further extending the useful life of the blade.

The triple chip ground carbide tip band saw blade 10 will cut large section of metal up to 60 inches square with accuracy unachievable using conventional blades with set teeth. The precision ground teeth 15 and 16 provide clearance for the blade to move through the cut without bending or setting the teeth as would occur when conventional band saw blades were used. By precision grinding the cutting surfaces of the teeth 15 and 16, the blade may be custom ground to meet requirements of cutting any type of metal.

In use, the chips carried by the blade back into the cut would tend to deflect the band saw tooth laterally during reentry into the side of the material being cut. The lateral deflection of the tooth results in a twisting torque on the carbide insert 15 or 16. This in turn causes both compressive and tensile stresses on the brazed joint.

These stresses were analyzed for triple chip band saw operating under the conditions as follows:

| Body thickness | .062 inches |
|---|---|
| Carbide width | .085 inches |
| Speed | 350 F.P.M. |
| Material Removal Rate | 4.4 in 3/min |
| Tooth Spacing | 1 inch |
| Horsepower | 10 |
| Material | 1018 |

The conditions for the band saw were taken from actual test conditions. With the filler 17, present in the brazing zone, the brazing zone becomes a relatively thick shock absorbing cushion for the carbide insert. During impact of the carbide with the side of the cut, with a lateral displacement of only 0.003 inches, the stresses would momentarily build up to 160,000 PSI compression and 102,000 PSI tension if the copper filler 17 were not present. However, with the filler 17 provided to absorb the forces, the stresses build up only to the yield stress of the filler 17, which is 20,000 PSI, beyond which there is only a ductile energy absorbing distortion of the filler. It should be pointed out that these high stress levels are transitory in nature and last for only a milli-second or less. The total energy absorbed is small and excessive distortion of the filler and tooth position is not significant.

The filler 17 minimizes those forces or stresses induced in the brazing zone as the band saw blade bends around the machine wheels and is twisted through the guides. The low tooth 16 of the triple chip pair which removes two equal chips with the outside cutting corners prone to the torque loads caused by lateral deflection. The high tooth 15 removes a single chip from the center. While the high tooth 15 is not prone to the torque loads of the low tooth, it is prone to high compressive shock loads when cutting material with a hard scale. Here again the copper filler acts as a shock absorber and minimizes the loads which could otherwise cause fracture of the carbide. The filler is compressed under shock and is squeezed out of the joint.

By changing the angles at which the teeth are ground, the amount of material removed from the cut may be predeterminedly controlled. Therefore, if the blade is ground to cut more aggressively, then lighter feed forces are required for the blade to penetrate into the material being cut. By reducing the feed force, the tendency of the saw blade to cut crooked is significantly reduced. Providing carbide tooth inserts for a band saw blade and precision grinding of the teeth eliminates errors associated with conventional set blades such as uneven side-to-side tooth set which causes crooked cutting, light set which results in short blade life, heavy set which results in rough finish of the surfaces being cut, and non-symmetrical cutting forces on the teeth which would cause vibration, noise and wear.

On the triple chip ground blade, there is an absence of clearance between the cutting edge of the teeth and the kerf of the cut because of the relief angles provided on the side surfaces of the saw tooth. This reduces the opportunity for blade vibration during cutting.

While there has been described one embodiment of the invention, it is apparent that modification may be made in structure and material without departing from the spirit and scope of the invention. For example, the filler ductile layer may be wider or narrower than that disclosed, and may be of other ductile metals such as tin, bronze, zinc or the like. Also, the carbide teeth may be the DANIT type DS 130 Grade P-20 or like material.

We claim:

1. In a bandsaw blade for high speed, heavy duty cutting of a workpiece, the combination comprising:
   a blade body of a continuous loop of hardened and tempered metal having a plurality of cutting tooth support means defined along the peripheral edge thereof and separated by gullet means;
   a plurality of carbide cutting teeth mounted on said blade body in the tooth support means thereof and arranged in pairs;
   each pair of said cutting teeth including a leading high tooth and a trailing low tooth constructed and arranged to effect a triple-chip cutting operation on the workpiece; and,
   solder means for securing said cutting teeth to said cutting tooth support means, said solder means including ductile means therein for absorbing the stress forces induced in the tooth support means under dynamic load conditions.

2. A bandsaw blade according to claim 1, wherein said solder means is comprised of first and second layers of a solder alloy with said ductile means being a discrete layer sandwiched therebetween.

3. A bandsaw blade according to claim 2, wherein said ductile means is a metal selected from the group consisting of copper, tin and bronze.

4. A bandsaw blade according to claim 3, wherein said solder alloy comprises a mixture of copper, cadium, zinc and silver.

5. A bandsaw blade according to claim 2, wherein the thickness of said solder means is in the order of 0.007 inches.

6. A bandsaw blade according to claim 5, wherein the width of said solder means is in the order of 0.100 inches.

7. A bandsaw blade according to claim 1, wherein each of said tooth support means comprises a shoulder defined in said blade body rearward of its associated gullet means and a surface extending normal to said shoulder and defining a generally L-shaped mounting surface for supporting each of said cutting teeth, with each of said cutting teeth having a bottom surface supported on said shoulder and a rearward surface extending along said normal surface and said solder means interposed between said mounting surface and said rear and bottom surfaces of said tooth to secure the same to said tooth support means.

8. A bandsaw blade according to claim 7, wherein each of said teeth further includes a top surface, a front surface and first and second side surfaces, said top surfaces of said high and low teeth being inclined rearwardly from the corresponding front surface relative to the longitudinal axis of the blade body defining a clearance angle in the range of between about five degrees and nineteen degrees.

9. A bandsaw blade according to claim 8, wherein said front surfaces of said high and low cutting teeth are positively raked at an angle in the range of between about zero degrees to ten degrees.

10. A bandsaw blade according to claim 7, wherein each of said teeth further includes a top surface, a front surface and first and second side surfaces, said first and second side surfaces being inclined radially of the longitudinal axis of said blade body by an angle in the range of between about one degree to six degrees providing radial relief for an inner portion of said cutting tooth relative to the work piece and said first and second side surfaces of said teeth further being inclined tangentially of the longitudinal axis of said blade body by an angle in the range of between about two degrees to seven degrees providing tangential relief for said inner position of said cutting tooth relative to the work piece.

11. In a bandsaw blade for high speed, heavy duty cutting of a workpiece, the combination comprising:
a blade body of a continuous loop of hardened and tempered metal, having a plurality of cutting tooth support means defined along the peripheral edge thereof and separated by gullet means;
a plurality of carbide cutting teeth mounted on said blade body in the tooth support means thereof and arranged in pairs to effect a triple-chip cutting operation on a workpiece; and,
solder means for securing said cutting teeth to said tooth support means;
each pair of cutting teeth including a leading high tooth and a trailing low tooth shorter than said high tooth, each tooth including a top surface, a front surface and first and second side surfaces,
said top surfaces of said high and low teeth being inclined rearwardly from corresponding front surfaces, relative to the longitudinal axis of said blade body defining a clearance angle for said high and low teeth,
said front surfaces of said high and low teeth being positively raked, defining a face angle for said high and low teeth,
said first and second side surfaces of said high and low teeth being inclined radially and tangentially of the longitudinal axis of said blade body, defining radial and tangential relief angles for said high and low teeth, and corner portions of said leading high tooth being cut away to expose corner cutting edges of the following low teeth to the workpiece, and said solder means including a ductile metal means therein for absorbing stress forces induced in the tooth support means under dynamic load conditions.

12. A bandsaw blade according to claim 11, wherein the clearance angle for said teeth is in the range of between about five degrees to nineteen degrees.

13. A bandsaw blade according to claim 12, wherein the clearance angle is fifteen degrees.

14. A bandsaw blade according to claim 6, wherein the face angle for said teeth is in the range of between about ten degrees to nine degrees.

15. A bandsaw blade according to claim 14, wherein the face angle is five degrees.

16. A bandsaw blade according to claim 11, wherein the radial relief angle for said teeth is in the range of between about one degree to six degrees.

17. A bandsaw blade according to claim 11, wherein the radial relief angle is three degrees.

18. A bandsaw blade according to claim 11, wherein the tangential relief angle for said teeth is in the range of between about two degrees to seven degrees.

19. A bandsaw blade according to claim 18, wherein the tangential relief angle is four degrees.

20. A bandsaw blade according to claim 11, wherein said corner portions of said leading high teeth are ground away at a corner angle in the range of between about thirty-nine degrees to fifty-two degrees relative to the longitudinal axis of said blade body.

21. A bandsaw blade according to claim 20, wherein the corner angle is forty-five degrees.

22. A bandsaw blade according to claim 11, wherein the spacing between teeth is in the range of between about 0.33 inches to two inches.

23. A bandsaw blade according to claim 11, wherein said solder means includes first and second layers of a solder alloy with said ductile metal means being a discrete layer sandwiched therebetween.

24. A bandsaw blade according to claim 23, wherein said solder alloy comprises a mixture of silver, cadium, zinc and copper and said ductile metal means is copper.

* * * * *

UNITED STATES PATENT AND TRADEMARK OFFICE
CERTIFICATE OF CORRECTION

PATENT NO. : 4,784,033
DATED : November 15, 1988
INVENTOR(S) : Robert C. Hayden and Michael P. Wanat It is certified that error appears in the above—identified patent and that said Letters Patent is hereby corrected as shown below:

Column 6, line 17, change "22a and 232a" to --22 and 23--;

line 19, change "32a, 33a" to --32, 33--;

Column 7, line 12, change "clearnace" to --clearance--;

line 24, change "ngle," to --angle,--;

Column 9, line 56, change "position" to --portion--.

Signed and Sealed this

Sixteenth Day of May, 1989

*Attest:*

DONALD J. QUIGG

*Attesting Officer*    *Commissioner of Patents and Trademarks*